(12) United States Patent
Kawakatsu

(10) Patent No.: US 7,039,070 B2
(45) Date of Patent: May 2, 2006

(54) MOVING IMAGE PACKET DECODING AND REPRODUCING APPARATUS, REPRODUCTION TIME CONTROL METHOD THEREOF, COMPUTER PROGRAM PRODUCT FOR CONTROLLING REPRODUCTION TIME AND MULTIMEDIA INFORMATION RECEIVING APPARATUS

(75) Inventor: Hirokazu Kawakatsu, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 880 days.

(21) Appl. No.: 09/983,674

(22) Filed: Oct. 25, 2001

(65) Prior Publication Data

US 2002/0051467 A1    May 2, 2002

(30) Foreign Application Priority Data

Oct. 27, 2000    (JP) .............................. 2000-329266

(51) Int. Cl.
*H04J 3/06* (2006.01)
*H04N 7/00* (2006.01)
*H04N 5/04* (2006.01)

(52) U.S. Cl. .................. 370/503; 370/509; 370/395.62; 386/46; 386/66; 348/497; 348/500

(58) Field of Classification Search ................ 370/503, 370/509, 395.62; 348/497, 500; 386/46, 386/66
See application file for complete search history.

(56) References Cited

U.S. PATENT DOCUMENTS 5,742,623 A    4/1998  Nuber et al.
6,021,168 A *  2/2000  Huh ............................ 375/376
6,069,993 A *  5/2000  Kawara ........................ 386/68
6,101,195 A *  8/2000  Lyons et al. ................. 370/498
6,141,385 A * 10/2000  Yamaji ..................... 375/240.27
6,148,135 A * 11/2000  Suzuki ......................... 386/12
6,381,254 B1*  4/2002  Mori et al. .................. 370/537
6,429,902 B1*  8/2002  Har-Chen et al. ........... 348/518
6,859,612 B1*  2/2005  Shida et al. ................... 386/68
6,862,045 B1*  3/2005  Morimoto et al. .......... 348/515

FOREIGN PATENT DOCUMENTS

EP    0668700 A2    8/1995
EP    0719054 A2    6/1996
WO    00/57647      9/2000

* cited by examiner

*Primary Examiner*—Ricky Q. Ngo
*Assistant Examiner*—Feben Micael Haile
(74) *Attorney, Agent, or Firm*—Finnegan, Henderson, Farabow, Garrett & Dunner, L.L.P.

(57) ABSTRACT

Error correcting section holds PTS(n−1) and DTS(n−1) of the frame immediately preceding the current frame and the most recent CPTS as determined to be correct in the past. The time stamp of the current frame is determined to be incorrect if (1) CPTS>PTS(n) which is the current frame or (2) CPTS<PTS(n) and greater than the time interval of time information B_TS(n)−B_TS(n−1) plus a reference time (e.g., the multiple of the standard frame interval 33 msec of moving images using 30 frames per second). If the PTS(n) of the current frame is correct, it is used as reproduction timing and updates the CPTS, using the PTS(n). If, on the other hand, the PTS(n) of the current frame is incorrect, it is not used and the time obtained by adding the CPTS and B_TS(n)−B_TS(n−1) is used as corrected PTS(n).

20 Claims, 5 Drawing Sheets

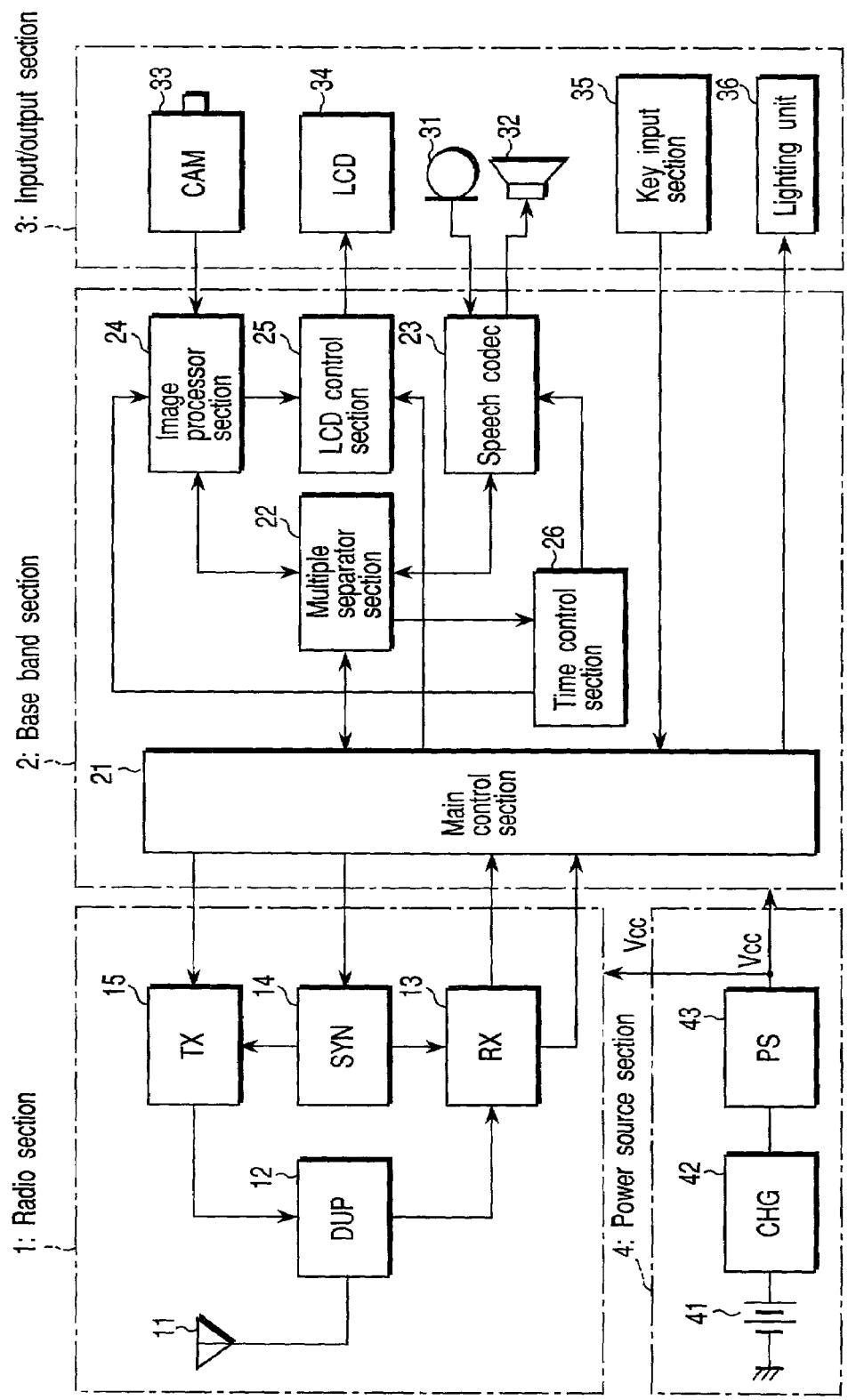
F I G. 1

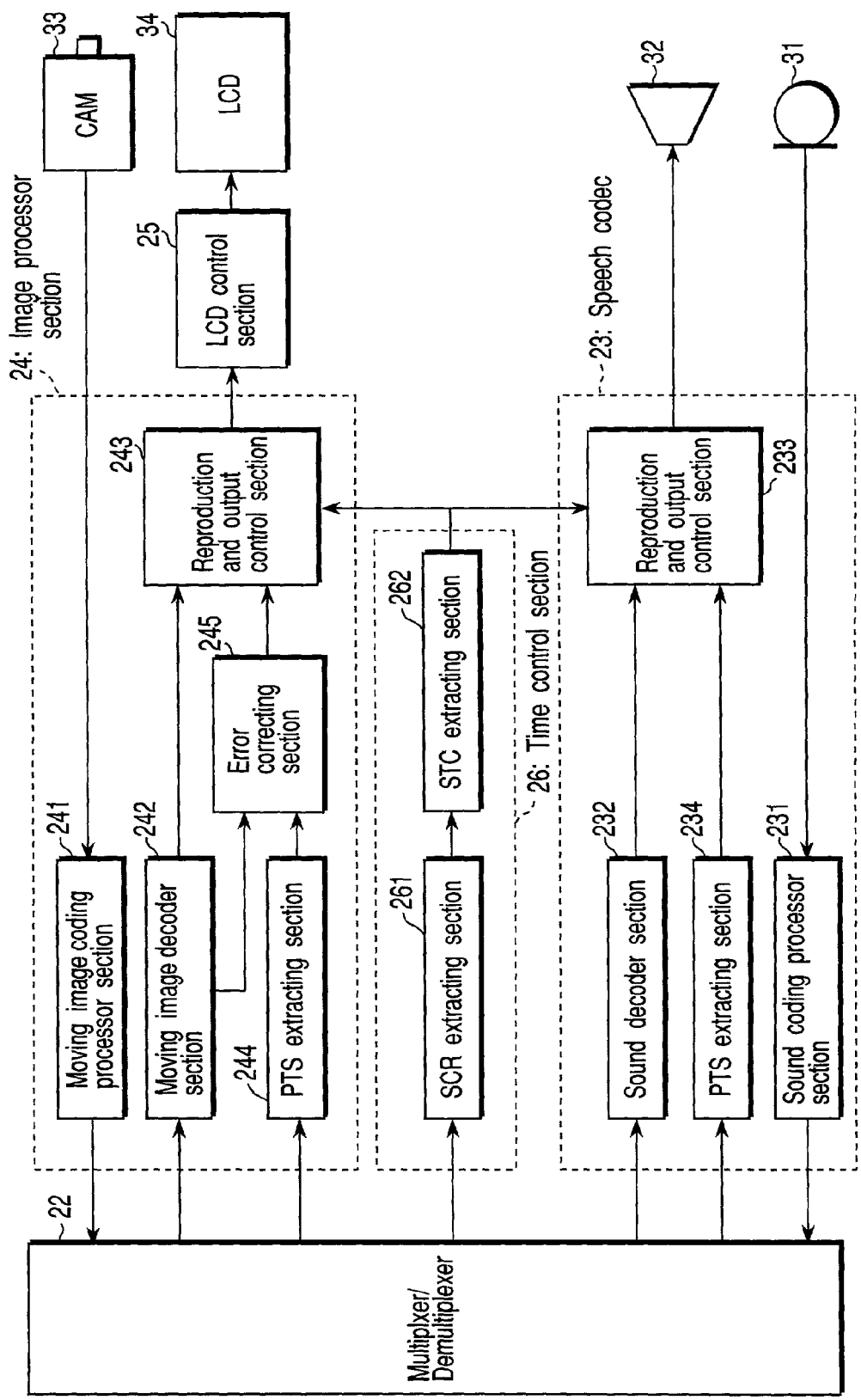
F I G. 2

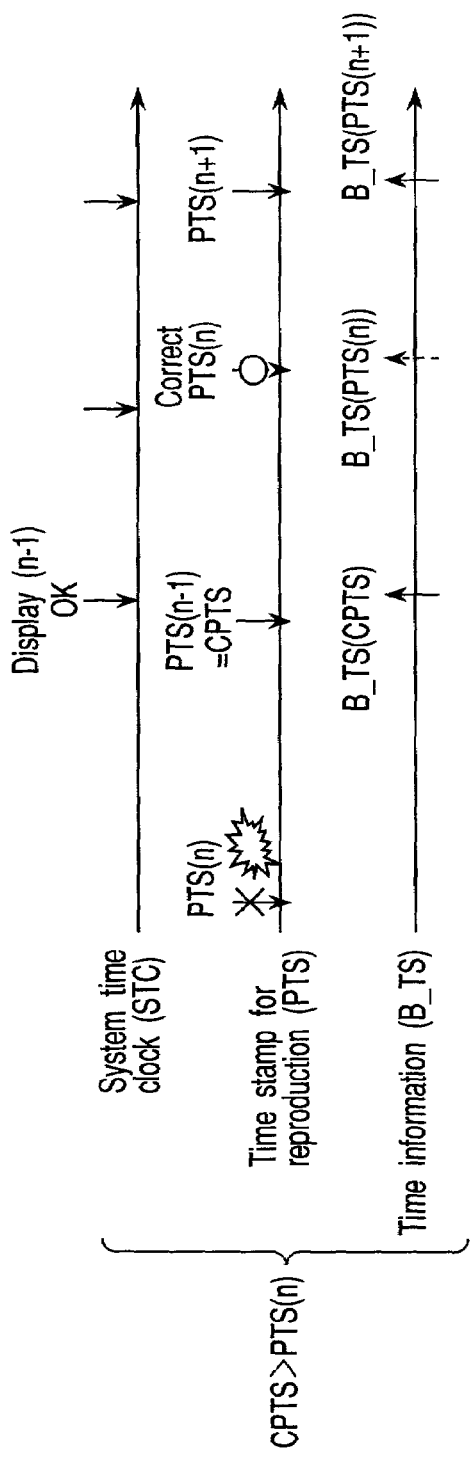
F I G. 3A
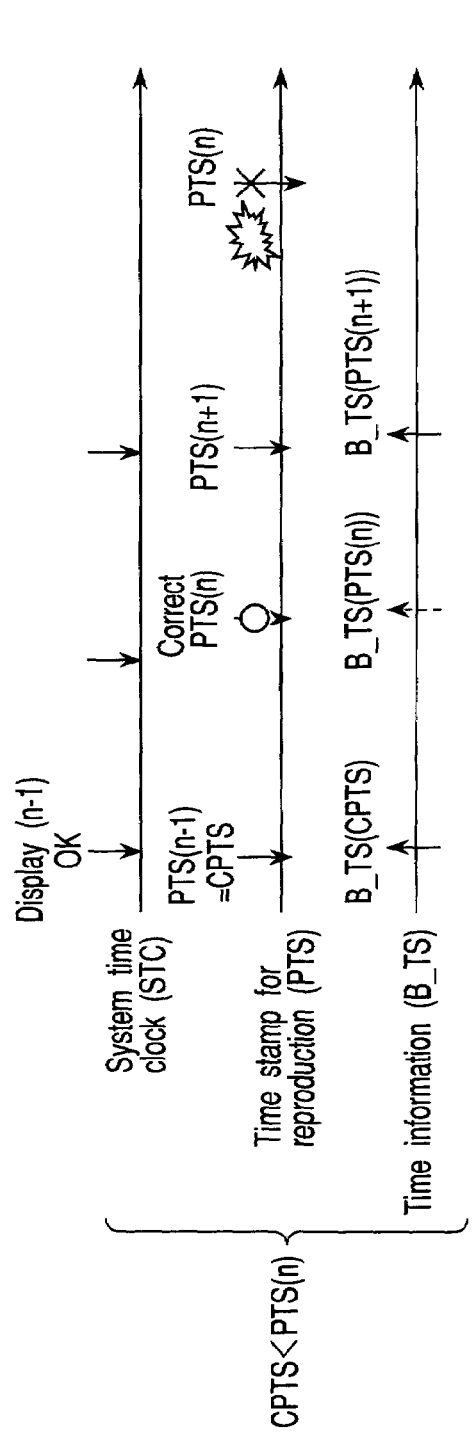
F I G. 3B

MOVING IMAGE PACKET DECODING AND REPRODUCING APPARATUS, REPRODUCTION TIME CONTROL METHOD THEREOF, COMPUTER PROGRAM PRODUCT FOR CONTROLLING REPRODUCTION TIME AND MULTIMEDIA INFORMATION RECEIVING APPARATUS

CROSS-REFERENCE TO RELATED APPLICATIONS

This application is based upon and claims the benefit of priority from the prior Japanese Patent Application No. 2000-329266, filed Oct. 27, 2000, the entire contents of which are incorporated herein by reference.

BACKGROUND OF THE INVENTION

1. Field of the Invention

This invention relates to a multimedia information receiving apparatus for receiving multimedia information typically prepared by multiplexing an audio signal and a moving image signal that are related to each other and compressed separately, demultiplexing and expanding the audio signal and the moving image signal and reproducing them synchronously. More particularly, the present invention relates to a moving image packet decoding and reproducing apparatus and also to a computer program product for controlling the reproduction time adapted to be used with such an apparatus.

2. Description of the Related Art

Generally, in digital broadcasting, a transmission method of digitally coding and compressing a moving image signal (V) and an audio signal (A) and subsequently multiplexing the signals to produce multimedia information and transmit it in a single stream is used. In a system using such a transmission method, the two signals including the moving image signal and the audio signal have to be synchronously reproduced at the signal receiving side. In view of this problem, MPEG-2 (Moving Pictures Experts Group) provides that the operation of synchronously reproducing the moving image signal and the audio signal is controlled by using a piece of output timing information that is referred to as time stamp.

An AV synchronizing method that is proposed for a transmission system using an MPEG-2 transport stream (MPEG-2TS) and currently popularly being used for digital broadcasting will be described below.

The moving image signal and the audio signal are divided into units of decoding and reproduction (e.g., a frame in the case of a moving image) that are referred to as access units, which are then transformed into packets referred to as PES (Packetized Elementary Stream) in the apparatus comprising an encoder of the transmitting side. At this time, a piece of time control information (Time Stamp) for signal reproduction and output that is referred to as PTS (Presentation Time Stamp) is added to the header of each packet of the moving image signal and the audio signal. The decoder of the receiving side contains a timer called STC (System Time Clock) and each of the access units is reproduced and output when the value of the timer (reference time) agrees with the PTS of the corresponding packet.

In real time transmission, it is necessary for both the transmitting side and the receiving side to synchronize the signals on a real time basis in a controlled manner, using a buffer control technique, in order to consummate the transmission/reception successfully.

With MPEG-2TS, each PES packet is further divided into smaller packets referred to as transport stream packets (TSs) having a fixed length. At this time, the transmitting side adds a signal called PCR (Program Clock Reference) to the header of the TS packet for the purpose of calibration of reference time and the receiving side constantly monitors the PCR and the STC and, if necessary, correct STC in order to establish synchronism of signal transmission and signal reception.

In recent years, systems for streaming media designed to deliver multimedia information by way of the Internet and multimedia data broadcasting using a narrow band have been started. These systems mostly employ a moving image coding method conforming to MPEG-4, an audio coding method typically conforming to AAC (Advanced Audio Coding) or AMR (Adaptive Multi rate) and an A/V synchronizing method using a time stamp similar to the one provided in MPEG-2.

Meanwhile, in conventional digital broadcasting systems where the transmission bit rate is as high as several Mbps, it is possible to correct errors in time stamp information firmly and reliably. In other words, it is not conceivable that errors are contained in time stamp information. In the case of delivering multimedia information by way of the Internet, it is not conceivable that errors are contained in time stamp information because of the transmission system is adapted to use a TCP (Transmission Control Protocol).

However, in the case of data transmission systems and mobile telephone systems comprising mobile communication terminals where the transmission bit rate is low, it is not allowable to assign a wide band to the feature of correcting errors in the system data area including time stamps. Furthermore, when multimedia contents are transmitted on a real time basis by radio transmission, measures not involving retransmission will more often than not be taken as in the case of UDP (User Datagram Protocol), although errors due to radio transmission may additionally be involved. Then, it is probable that errors frequently occur in time stamps. Particularly, since the volume of data of a moving image is large, errors can occur in the time stamps in the moving image signal. Then, the moving image can be displayed at irrelevant timing to miss the synchronism with the reproduction and output of the corresponding sound.

BRIEF SUMMARY OF THE INVENTION

Therefore, it is the object of the present invention to provide a reproduction time control method adapted to correct time stamp information when one or more than one error occurs in the time stamp information to be used for synchronizing the reproduction of a moving image and a corresponding sound realized by demultiplexing the signal of the moving image and that of the corresponding sound in the multimedia information obtained by multiplexing the bit stream of the moving image and that of the sound, a computer program product for realizing the method, a moving image decoding and reproducing apparatus that can reliably synchronize the moving image signal and the audio signal through the processing operation of the program product and a multimedia information receiving apparatus comprising such a moving image decoding and reproducing apparatus.

In an aspect of the present invention, there is provided an apparatus for decoding and reproducing moving-image packets, comprising:

a decoding section which continuously receives the moving-image packets, extracts from each moving-image packet a moving-image bit stream corresponding to one image frame, decodes the moving-image bit stream into a frame image signal, and separates time information of the frame image signal from the moving-image bit stream while decoding the moving-image bit stream;

a time stamp extracting section which continuously receives the moving-image packets, extracts a time stamp of one image frame from each moving-image packet, the time stamp having been given to each moving-image packet and relating to the time when the moving-image bit stream contained in each moving-image packet is reproduced in the form of a frame;

an error correcting section which determines whether the time stamp extracted by the time stamp extracting section is correct, on the basis of the time information extracted by the decoding section and the latest time stamp determined to be correct; and an output section which determines a reproduction timing from the time stamp output from the error correcting section and outputs the frame image signal output from the decoding section at the reproduction timing.

In another aspect of the invention, there is provided a reproduction-time control method for use in a moving image decoding and reproducing apparatus which continuously receives the moving-image packets, extracts from each moving-image packet a moving-image bit stream corresponding to one image frame and a time stamp corresponding to a reproduce time of the moving-image bit stream, and decodes the moving-image bit stream into a frame image signal, wherein the moving-image bit stream contains time information of the frame image signal and is separated from the moving-image bit stream while the moving-image bit stream is being decoded, the method comprising:

a first step of determining that the time stamp of a present packet is incorrect when a time stamp separated from the present packet represents an earlier time than the time represented by the latest time stamp determined to be correct;

a second step of calculating a reference time by adding a time obtained to the latest time stamp determined to be correct plus a predetermined time to a difference between the time information of a frame image signal corresponding to the latest time stamp determined to be correct and the time information of a frame signal separated from the present packet, and determining that the time stamp is incorrect, in the case where the time stamp extracted from the present packet time has passed the reference time;

a third step of correcting the time stamp separated from the present packet in the first and second steps, when the time stamp is determined to be incorrect in the first and second steps, in accordance with the latest time stamp determined to be correct, the time information of the frame signal corresponding to the time stamp, and the time information of the frame image signal obtained from the present packet; and a fourth step of storing the time stamp not determined to be incorrect in the first and second steps, as the latest time stamp determined to be correct to be used in the first to third steps.

In still another aspect of the invention, there is provided a program product for controlling reproduction time in a moving-image packet decoding and reproducing apparatus which continuously receives the moving-image packets, extracts from each moving-image packet a moving-image bit stream corresponding to one image frame and a time stamp corresponding to a reproduce time of the moving-image bit stream, and decodes the moving-image bit stream into a frame image signal, wherein the moving-image bit stream contains time information of the frame image signal and is separated from the moving-image bit stream while the moving-image bit stream is being decoded, the program product comprising:

a first program code for determining that the time stamp of a present packet is incorrect when a time stamp separated from the present packet represents an earlier time than the time represented by the latest time stamp determined to be correct;

a second program code for calculating a reference time by adding a time obtaining to the latest time stamp determined to be correct plus a predetermined time to a difference between the time information of a frame image signal corresponding to the latest time stamp determined to be correct and the time information of a frame signal separated from the present packet, and for determining that the time stamp is incorrect, in the case where the time stamp extracted from the present packet time has passed the reference time;

a third program code for correcting the time stamp separated from the present packet in the first and second steps, when the time stamp is determined to be incorrect in the first and second steps, in accordance with the latest time stamp determined to be correct, the time information of the frame signal corresponding to the time stamp, and the time information of the frame image signal obtained from the present packet; and a fourth program code for storing the latest time stamp not determined to be incorrect by executing the first and second program codes, as the latest time stamp determined to be correct to be used in process performed by executing the first to third program codes.

In a further aspect of the invention, there is provided an apparatus for receiving multimedia information comprising an audio packet and a moving-image packet multiplexed with the audio packet, the apparatus comprising:

a demultiplex section which demultiplexes the audio packet and the moving-image packet from the multimedia information, the audio packet comprising an audio bit stream corresponding to one image frame and a time stamp relating to a frame-reproducing time, and the moving-image packet comprising a moving-image bit stream and a time stamp relating to a frame-reproducing time;

an audio signal processing section which extracts the audio bit stream and the time stamp from the audio packet separated by the demultiplex section, decodes the audio bit stream into an audio signal, and outputs the audio signal at a reproduction timing based on the time stamp; and a moving-image processing section which extracts the moving-image bit stream from the moving-image packet demultiplexed by the demultiplex section, decodes the moving-image bit stream into a frame image signal, outputs the frame image signal at a reproduction timing based on the time stamp, and separates the time information of the frame image signal from the moving-image bit stream while the moving-image bit stream is being decoded;

the moving image processing section comprising an error correcting section which detects and corrects errors in a time stamp extracted from the moving-image packet, on the basis of a latest time stamp determined to be correct and time information of a frame image signal corresponding to the time stamp.

Additional objects and advantages of the invention will be set forth in the description which follows, and in part will be obvious from the description made above, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block diagram of an embodiment of a multimedia information receiving apparatus according to the invention as applied to a mobile communication terminal, illustrating its entire configuration;

FIG. 2 is a schematic block diagram of the speech codec, the image processor section, the time control section of the embodiment of FIG. 1;

FIG. 3A and FIG. 3B are illustrations of how a time stamp for reproduction is determined to be erring in the embodiment of FIG. 1;

DETAILED DESCRIPTION OF THE INVENTION

Figure 4:
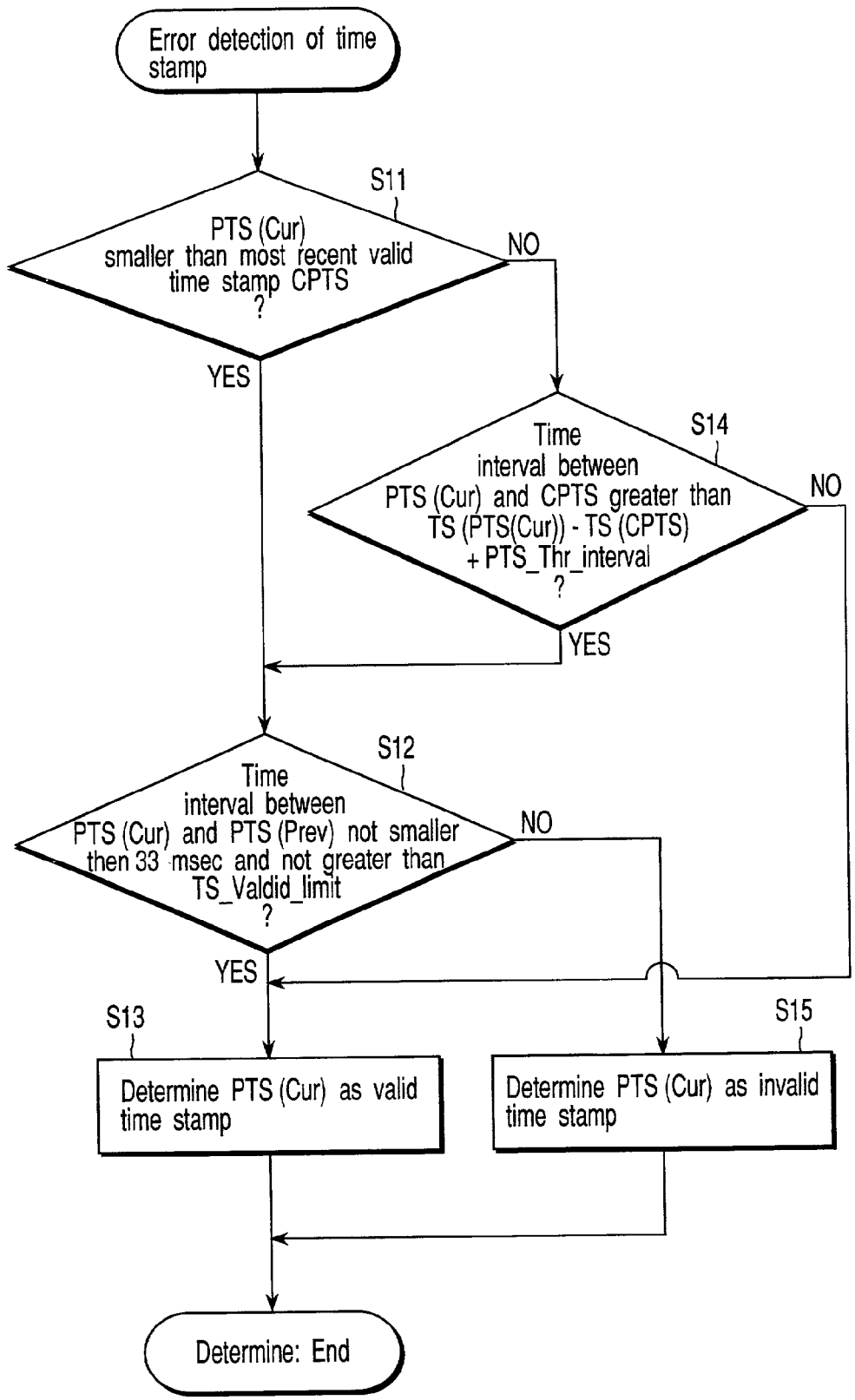
FIG. 4 is a flow chart of the processing operation of error diagnosis to be conducted for the time stamp for reproduction in the embodiment of FIG. 1.

Now, the present invention will be described in greater detail by referring to the accompanying drawings that illustrate preferred embodiments of the invention.

FIG. 1 is a schematic block diagram of an embodiment of a multimedia information receiving apparatus according to the invention as applied to a mobile communication terminal such as cellular telephone, illustrating its entire configuration. The mobile communication terminal MS shown in FIG. 1 comprises a radio section 1, a base band section 2, an input and output section 3 and a power source section 4.

Referring to FIG. 1, the radio frequency signal arriving from a base station (not shown) by way of a radio line of a mobile communication system is received by antenna 11 and input to reception circuit (RX) 13 by way of an antenna duplexer (DUP) 12. The reception circuit 13 comprises a high frequency amplifier, a frequency converter and a demodulator. The received radio frequency signal is subjected to low noise amplification by a low noise amplifier and then mixed with a local oscillation signal generated by frequency synthesizer (SYN) 14 in the frequency converter for a frequency conversion that turns the radio frequency signal into a reception intermediate frequency signal or a reception base band signal. The demodulator then digitally demodulates the output signal. An orthogonal demodulation method corresponding to the QPSK method may typically be used for the demodulation. The main control section 21 provided in the base band section 2 specifies the frequency of the local oscillation signal generated by the frequency synthesizer 14.

The demodulated signal output from said demodulator is then input to the base band section 2. The base band section 2 comprises a main control section 21, a multiplexer/demultiplexer 22, a speech coder/decoder (to be referred to as speech codec hereinafter) 23, an image processor section 24 and a liquid crystal display (LCD) control section 25.

Then, the main control section 21 identifies the demodulated signal fed from the reception circuit 13 to find out if it is control information or multimedia information. If it is found to be multimedia information, the TS packet thereof is supplied to the multiplexer/demuliplexer 22, which reconstructs the PES packet from the TS packet and demultiplexes the sound bit stream and the moving image bit stream from the PES packet. Additionally, the header information of the TS packet and that of the PES packet are also demultiplexed from them.

The sound bit stream demultiplexed by said multiplexer/demuliplexer 22 is then supplied to and decoded by the speech codec 23 and the decoded sound signal is reproduced/output according to the system time clock generated by time control section 26. Then, the original sound is acoustically reproduced from the loudspeaker 32 of the input/output section 3. On the other hand, the moving image bit stream demultiplexed by said multiplexer/demuliplexer 22 is then fed to and decoded by the image processor section 24 along with the PES packet header information and the decoded image signal is also reproduced/output according to the system time clock generated by the time control section 26. The reproduced image signal is then fed to the LCD 34 of the input/output section 3 by way of the LCD control section 25 and the original image is displayed on the display screen of the LCD 34.

The LCD 34 has the function of displaying various pieces of information on the operation of the apparatus as output from the main control section 21, including a telephone directory, the detected intensity of the received electric field and the remaining charge of the battery on the LCD 34.

The speech signal of the user output from the microphone 31 of the input/output section 3 is input to the speech codec 23 of the base band section 2 and coded into a sound bit stream there before being fed to the multiplexer/demuliplexer 22. On the other hand, the image signal input from the camera (CAM) 33 is supplied to the image processor section 24 of the base band section 2 and coded there according to MPEG-4 before fed to the multiplexer/demuliplexer 22. The multiplexer/demuliplexer 22 multiplexes the coded speech bit stream and the coded moving image bit stream in a predetermined format defined in the MPEG-2 system (conversion from PES packets into TS packets). The multiplexed transmission data (multimedia information) is then fed to the transmission circuit (TX) 15 of the radio section 1 from the main control section 21.

The transmission circuit 15 comprises a modulator, a frequency converter and a transmission power amplifier. The transmission data is digitally modulated by the modulator and mixed with the transmission local oscillation signal generated by the frequency synthesizer 14 in the frequency converter for a frequency conversion that turns the data into a radio frequency signal. The QPSK method may typically be used for the modulation. The generated transmission radio frequency signal is then amplified to a predetermined transmission level and supplied to the antenna 11 by way of the antenna duplexer 12, to transmit the signal to the base station (not shown).

The power source section 4 comprises a battery 41 such as a lithium ion battery, a charging circuit 42 for electrically charging the battery 41 and a voltage generation circuit (PS) 43. The voltage generation circuit 43 typically comprises a DC/DC converter and produces a predetermined supply voltage Vcc from the output voltage of the battery 41.

The input/output section 4 is provided with a lighting unit 36 for lighting the LCD 34 and the key input section 35 at the time of user operation and communication. The lighting unit 36 is also referred to as a "back light" or "illumination".

The main control section 21 comprises a microprocessor and an internal memory that may include a ROM and a RAM. It has standard control features of controlling the connection of radio channels and also the communication that takes place after the establishment of a communication link.

FIG. 2 is a schematic block diagram of the speech codec 23, the image processor section 24 and the time control section 26 of the embodiment of FIG. 1, illustrating their specific configurations.

Referring to FIG. 2, the sound signal from the microphone 31 is fed to the sound coding processor section 231 of said speech codec 23. The sound coding processor section 231 is adapted to compression coding of the input sound signal typically by means of the ACC method or the AMR method, and the sound bit stream output from the sound coding processor section 231 is fed to the multiplexer/demuliplexer 22.

The moving image signal output from the camera 33 is fed to the moving image signal encoder section 241 of the image processor section 24. The moving image signal encoder section 241 compresses and encodes the moving image data by means of the moving image coding method of MPEP-4 and generates a moving image bit stream, adding a time information to each frame as header information. The moving image bit stream output from the moving image encoder section 241 is then fed to the multiplexer/demuliplexer 22.

The multiplexer/demuliplexer 22 is adapted to packetize the signal input to it on a frame-by-frame basis or by a plurality of frames to generate PES packets. At this time, a time stamp (PTS) to be used for reproduction is added to each PES packet. Additionally, the multiplexer/demuliplexer 22 converts the PES packets into TS (Transport Stream) packets having a fixed length. A piece of information to be used for the purpose of calibration of reference time (generally referred to as PCR: Program Clock Reference) is added to the header of the TS packet in order to synchronize the system clock of the transmitter side with that of the receiver side.

As the multimedia information that is generated in a manner as described above is received, the multiplexer/demuliplexer 22 restores the PES packets from the received TS packets and demultiplexes the sound bit stream and the moving image bit stream from each of the PES packets with the respective pieces of PES packet header information. Then, it transmits the sound bit stream to the speech codec 23 with the corresponding PES packet header information and the moving image bit stream to the image processor section 24 with the corresponding PES packet header information. At this time, the header information of the TS packet obtained by the multiplexer/demuliplexer 22 is fed to the time control section 26.

The time control section 26 extracts the value of the program clock reference (PCR) from the header information of the TS packet and calibrates the system time clock (STC) by referring to the reference value. The system time clock (STC) is then fed to the speech codec 23 and the moving image processor section 24 and used for synchronous reproduction.

The sound bit stream from the multiplexer/demuliplexer 22 is fed to the sound decoder section 232 of the speech codec 23. The sound decoder section 232 is adapted to decode the sound bit stream and the decoded sound signal is fed to the reproduction/output control section 233. On the other hand, the header information of the PES packet from the multiplexer/demuliplexer 22 is fed to the PTS extracting section 234. The PTS extracting section 234 is adapted to extract the time stamp to be used for reproduction (PTS) from the PES packet header information and supplies the obtained time stamp for reproduction (PTS) to the reproduction and output control section 233. The reproduction and output control section 233 is adapted to reproduce and output the decoded sound signal when the time of the system time clock (STC) from the time control section 26 and that of the time stamp for reproduction PTS agree with each other. The reproduced sound signal is then sent to loudspeaker 32 and output as the original sound.

On the other hand, the moving image bit stream from the multiplexer/demuliplexer 22 is fed to the moving image decoder section 242 of the image processor section 24. The moving image decoder section 242 is adapted to decode the moving image bit stream and the time information in its header and the decoded moving image signal is fed to the reproduction and output control section 243. On the other hand, the header information of the PES packet from the multiplexer/demuliplexer 22 is fed to the PTS extracting section 244. The PTS extracting section 244 is adapted to extract the time stamp to be used for reproduction (PTS) from the PES packet header information and supplies the obtained time stamp for reproduction (PTS) to the reproduction and output control section 243 by way of the error correcting section 245. The reproduction and output control section 243 is adapted to reproduce and output the decoded moving image signal when the time of the system time clock (STC) from the time control section 26 and that of the time stamp for reproduction PTS agree with each other. The reproduced moving image signal is then sent to the LCD control section 25 and the original moving image is displayed on the LCD 34.

The error correcting section 245 receives the time information included in the moving image bit stream obtained by the moving image decoder section 242 and time stamp obtained by the PTS extracting section 244 and determines if the time stamp for reproduction (PTS) from the PTS extracting section 244 is correct or wrong on the basis of the time information (B_TS) obtained by the moving image bit stream and the past PTS. If the time stamp for reproduction (PTS) is determined to be wrong, it generates a presumably correct time stamp for reproduction on the basis the time information (B_TS) obtained by the moving image bit stream and the most recent time stamp for reproduction (PTS) as obtained from the moving image bit stream and determined to be correct in the past and outputs it to the reproduction and output control section 243 in place of the wrong time stamp (PTS).

Referring to FIGS. 3A, 3B and 4, the processing operation of detecting an error in the received time stamp for reproduction (PTS) and generating a replacement time stamp for reproduction (PTS) of the error correcting section 245 will be described below.

Each time the time control section 26 extracts the program clock reference (PCR), it compares it with the system time clock (STC) and appropriately calibrates the latter before sending it out to the reproduction and output control section 243 of the image processor section 24. In the image processor section 24, the image decoder section 242 decodes the moving image bit stream on a frame by frame basis and the PTS extracting section 244 extracts the time stamp for reproduction (PTS) corresponding to each frame and sets it in the reproduction and output control section 243. Then, the reproduction and output control section 243 reproduces and outputs the decoded moving image signal at the time when the system time clock (STC) passes the time of the time stamp for reproduction (PTS).

In the processing operation, the error correcting section 245 holds the time stamp for reproduction PTS(n−1) of the immediately preceding frame along with the most recently updated time stamp CPTS as determined to be correct in the past and the time information B_TS(K) (K being the frame number of the CPTS) obtained from the moving image bit stream of the frame. If the PTS(n−1) is determined to be correct, it is contained in the CPTS. On the other hand, if the PTS(n−1) is determined to be incorrect and the immediately preceding PTS(n−2) is determined to be correct, the PTS(n−2) is contained in the CPTS. The time stamp PTS(n) of the current frame extracted by the PTS extracting section 244 is determined to be correct or wrong in a manner as described below.

(1) If CPTS>PTS(n), the latter is determined to be wrong because time never goes back. FIG. 3A shows an example of such a case.

(2) If CPTS<PTS(n), the latter is determined to be wrong when it is greater than the sum of the time interval between the time information obtained from the inside of the moving image bit stream, or B_TS(PTS(n))−B_TS(CPTS), and a reference time PTS_Thr_interval (e.g., multiple of the standard frame interval 33 msec of moving images using 30 frames per second). FIG. 3B shows an example of such a case.

If the time stamp for reproduction PTS(n) of the current frame is determined to be correct as a result of the above operation, it is used as the time for reproduction and is sent to the reproduction and output control section 243, while the CPTS is updated by using the PTS(n). If, on the other hand, the time stamp for reproduction PTS(n) of the current frame is determined to be incorrect as a result of the above operation, it is not used but the sum of the CPTS and the time interval between the time information obtained from the inside of the moving image bit stream, or B_TS(PTS(n))−B_TS(CPTS), is transmitted to the reproduction and output control section 243 as a corrected time stamp for reproduction PTS(n).

However, there may be cases where the time stamp for reproduction (PTS) is determined to be incorrect and remains incorrect for a long time but the CPTS is not updated also for a long time. Therefore, in order to prevent a situation where the time stamp for reproduction (PTS) is correct but determined to be incorrect from taking place, the time interval of time stamps PTS(n)−PTS(n−1) is unconditionally determined to be correct so long as it is greater than the standard frame interval 33 msec of moving images using 30 frames per second and smaller than a reference value for comparison, or PTS_Valid_limit.

FIG. 4 is a flow chart of the processing operation of error detection to be conducted for the time stamp for reproduction in the embodiment of FIG. 1.

Referring to FIG. 4, firstly, it is determined if the time stamp for reproduction PTS(Cur) of the current frame is smaller than the immediately preceding time stamp for reproduction CPTS as determined to be valid, (PTS(Cur)<CPTS), or not (Step S11). If the time stamp for reproduction PTS(Cur) of the current frame is determined to be smaller, it is then determined if the time interval between the time stamp for reproduction PTS(Cur) of the current frame and the immediately preceding time stamp for reproduction PTS(Prev) is not smaller than 33 msec and not greater than the PTS_Valid_limit (33 msec≦(PTS(Cur)−PTS(Prev)≦PTS_Valid_limit) or not (Step S12). If the time interval is found to be within the above defined range, the time stamp for reproduction PTS(Cur) of the current frame is determined to be valid (Step S13).

If the requirement of Step S11 is not met, it is then determined information the time interval between the time stamp for reproduction PTS(Cur) of the current frame and the most recently updated time stamp CPTS as determined to be correct in the past (PTS(Cur)−CPTS) is greater than a total time the time interval between the time B_TS(PTS(Cur)) obtained from the time information inside of the moving image bit stream corresponding the time stamp for reproduction PTS(Cur) of the current frame and the time B_TS(CPTS) obtained from the time information inside of the moving image bit stream corresponding the most recently updated time stamp CPTS and the PTS time interval B_TS(PTS(Cur))−B_TS(CPTS)+PTS_thr_interval, or not (Step S14). If it is determined that the former time interval is greater, the processing operation moves back to Step S12. If, on the other hand, it is determined that the former time interval is smaller, the processing operation moves back to Step S13. If the requirement of Step S12 is not met, it is determined that the time stamp for reproduction PTS(Cur) of the current frame is an invalid time stamp (Step S15) and the processing operation is terminated.

Figure 5:
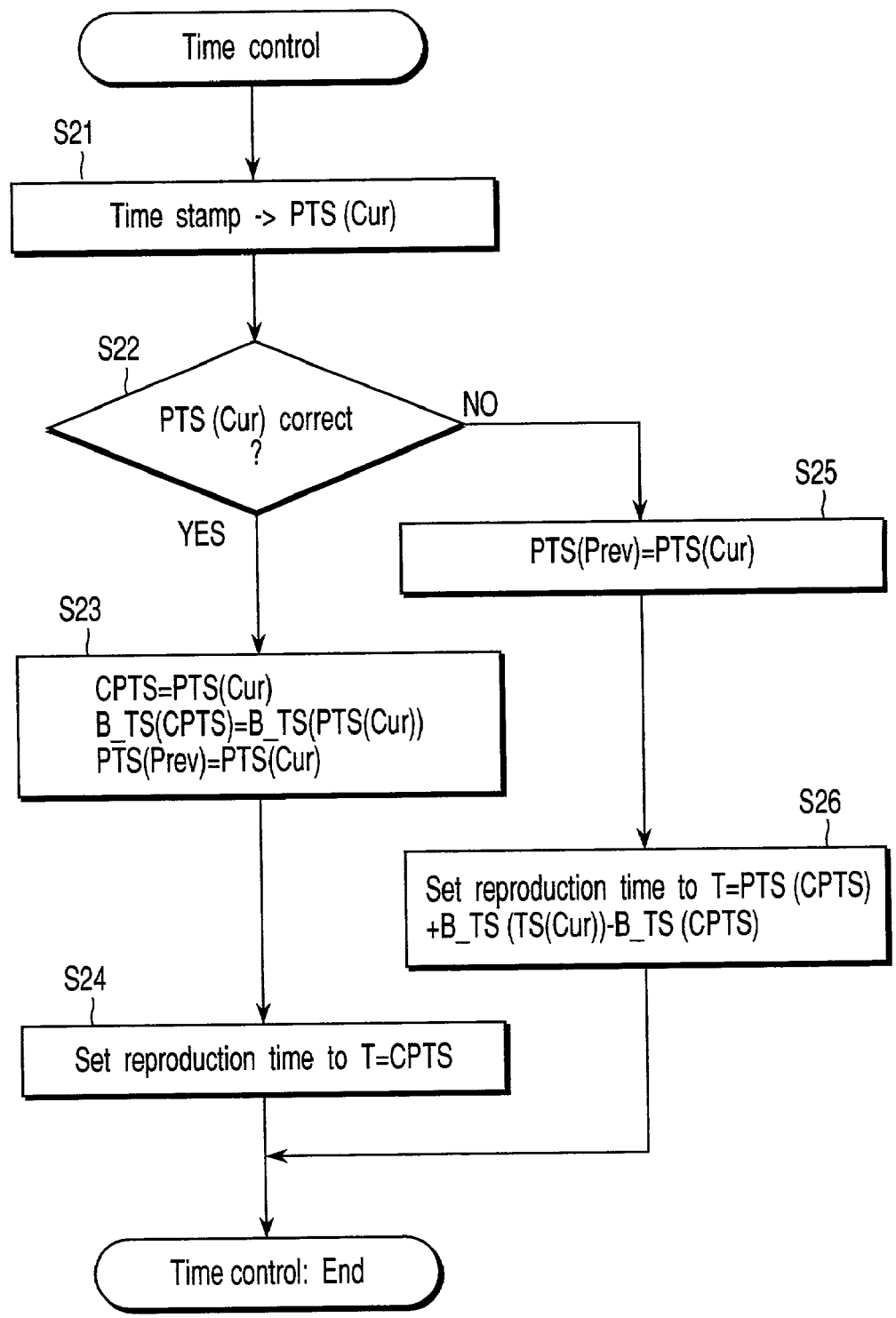
FIG. 5 is a flow chart of the processing operation of error correction to be conducted for the time stamp for reproduction in the embodiment of FIG. 1.

FIG. 5 is a flow chart of the processing operation of error correction to be conducted for the time stamp for reproduction in the embodiment of FIG. 1.

Referring to FIG. 5, the time stamp for reproduction PTS(Cur) of the current frame is input (Step S21) and it is determined if the PTS(Cur) is correct or not by the error detecting operation of FIG. 4 (Step S22). If it is determined that the PTS(Cur) is correct, equations CPTS=PTS(Cur) and B_TS(CPTS)=B_TS(PTS(Cur)), PTS(Prev)=PTS(Cur) are made to hold true (Step S23) and the reproduction time T is set to T=CPTS (Step S24).

If, on the other hand, it is determined that the PTS(Cur) is not correct in Step S22, PTS(Prev)=PTS(Cur) is used (Step S25) and the reproduction time is set to T=PTS(CPTS)+B_TS(PTS(Cur))−B_TS(CPTS) (Step S26) and the processing operation is terminated.

With the above processing operation, it is possible to correctly determine if the time stamp for reproduction PTS of the current frame is correct or not. If the time stamp for reproduction PTS is determined to be incorrect, it can be corrected by using the time information added to the frame header of the moving image bit stream as obtained from the inside of the moving image bit stream. As a result, if an error occurs to the time stamp for reproduction PTS, the moving image signal and the sound signal can be reliably synchronized.

The above embodiment is described in terms of the image processing section of a mobile communication terminal to which the present invention is applied. However, the present invention is by no means limited thereto and can be equally applied to a receiving apparatus of a multimedia information transmission system conforming to MPEP-4 of a similar standard.

The parts related to the operation of decoding and reproducing moving image signals and that of time control in the image processing section 24 may be modularized in the form of IC chips for the purpose of marketing. The processing operation of error detection to be conducted for the time stamp for reproduction as shown in FIG. 4 and the processing operation of error correction to be conducted for the time stamp for reproduction as shown in FIG. 5 can be marketed as computer program products for reproduction time control by way of telephone lines and the Internet.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An apparatus for decoding moving-image bit streams contained in moving-image packets and reproducing image frames, the apparatus comprising:
   a timer which generates a system time;
   a decoding unit configured to receive the moving-image packets, extract from each moving-image packet a moving-image bit stream corresponding to an image frame, decode the moving-image bit stream into the image frame, and separate time information of the image frame from the moving-image bit stream;
   a time stamp extracting unit configured to receive header information of the moving-image packet and extract a time stamp, to be used for reproduction of the image frame, from the header information;
   an error correcting unit configured to determine whether the time stamp extracted by the time stamp extracting unit is correct based upon the time information extracted by the decoding unit and a latest time stamp determined to be correct, and to correct the time stamp based upon the latest time stamp and the time information if the stamp is determined to be incorrect; and
   an output unit configured to reproduce the image frame by comparing the system time stamp extracted by the time stamp extracting unit and the time stamp corrected by the error correcting unit.

2. The apparatus according to claim 1, wherein the error correcting unit stores the latest time stamp determined to be correct, and determines that a present time stamp is incorrect if a time stamp of the present moving-image packet represents an earlier time than the stored latest time stamp.

3. The apparatus according to claim 2, wherein the error correcting unit stores the latest time stamp determined to be correct and time information corresponding to the stored latest time stamp, calculates a reference time by adding the stored latest time stamp, a predetermined time, and a difference between the stored time information and time information of a present moving-image bit stream, and determines that the time stamp is incorrect if the time has passed the reference time even if the time stamp extracted from the present moving-image packet represents a time later than the time represented by the stored latest time stamp.

4. The apparatus according to claim 3, wherein the error correcting unit stores the time stamp as the latest time stamp if the time stamp extracted by the time stamp extracting unit is determined to be correct, the error correcting unit adds a difference between the stored time information and the time information of the present moving-image bit stream to the stored latest time stamp if the time stamp extracted by the time stamp extracting unit is determined to be correct, generated a corrected time stamp, and outputs the corrected time stamp.

5. The apparatus according to claim 3, wherein the error correcting unit stores a time stamp extracted from the header information of the moving-image packet immediately preceding the present moving-image packet, obtains a difference between the time stamp extracted from the header information of the present moving-image packet and the time stamp of the moving-image packet immediately preceding the present moving-image packet, and determines that the time stamp of the present moving-image packet is correct if the difference is longer than a minimum frame interval and is not longer than a predetermined time.

6. An apparatus for receiving multimedia information including audio packets and moving-image packets multiplexed with the audio packets, the apparatus comprising:
   a timer which generates a system time;
   a demultiplexer which demultiplexes an audio packet and a moving-image packet from the multimedia information, said audio packet comprising an audio bit stream corresponding to an image frame and a time stamp relating to a frame-reproducing time;
   an audio signal processor which extracts the audio bit stream and the time stamp from the audio packet separated by the demultiplex section, decodes the audio bit stream into an audio signal, and outputs the audio signal at a reproduction timing based on the time stamp; and
   a moving-image processor which outputs the image frame,
   wherein the moving-image processor comprises:
      a decoding unit configured to receive the moving-image packets separated by the demultiplexer, extract from each moving-image packet a moving-image bit stream corresponding to an image frame, decode the moving-image bit stream into the image frame, and separate time information of the image frame from the moving-image bit stream;
      a time stamp extracting unit configured to receive a header information of the moving-image packets and extract a time stamp, to be used for reproduction of the image frame, from the header information;
      an error correcting unit configured to determine whether the time stamp extracted by the time time stamp extracting unit is correct based upon the time information extracted by the decoding unit and the latest time stamp determined to be correct, and correct the time stamp based upon the latest time stamp and the time information if the time stamp is determined to be incorrect; and
      an output unit configured to reproduce the image frame by comparing the system time with one of the time stamp extracted by the time stamp extracing unit and the time stamp corrected by the error corrector.

7. The apparatus according to claim 6, wherein the error correcting unit stores the latest time stamp determined to be correct, and determines that a present time stamp is incorrect if a time stamp extracted from the present moving-image packet represents an earlier time than the stored latest time stamp.

8. The apparatus according to claim 6, wherein the error correcting unit stores the latest time stamp determined to be correct and time information corresponding to the stored latest time stamp; calculates a reference time by adding the stored latest time stamp, predetermined time, and a difference between the stored time information and the time information of a present moving-image bit stream; and determines that the time stamp is incorrect if the time has passed the reference time even if the time stamp extracted from the present moving-image packet represents a time later than the time represented by the stored latest time stamp.

9. The apparatus according to claim 8, wherein the error correcting unit stores the time stamp as the latest time stamp;

and if the time stamp extracted by the time stamp extracting unit is determined to be incorrect, the error correcting unit adds a difference between the stored time information and the time information of the present moving-image bit stream to the stored latest time stamp if the time stamp is determined to be incorrect, generates a corrected time stamp, and outputs the corrected time stamp.

10. The apparatus according to claim 8, wherein the error correcting unit stores a time stamp extracted from the header information of the moving-image packet immediately preceding the present moving-image packet, obtains a difference between the time stamp extracted from the header information of the present moving-image packet and the time stamp of the moving-image packet immediately preceding the present moving-image packet, and determines that the time stamp of the present moving-image packet is correct if the difference is longer than a minimum frame interval and is not longer than a predetermined time.

11. A reproduction control method for use in an apparatus for decoding moving-image bit streams contained in moving-image packets and reproducing image frames, the method comprising:
  generating a system time;
  receiving the moving-image packets;
  extracting from each moving-image packet a moving-image bit stream corresponding to an image frame and header information;
  separating time information of the image frame from the moving-image bit stream;
  extracting a time stamp, to be used for reproduction of the image frame, from the header information;
  determining whether the extracted time stamp is correct based upon the separated time information and the latest time stamp determined to be correct;
  correcting the extracted time stamp based upon the latest time stamp determined to be correct and the separated time information if the extracted time stamp is determined to be incorrect; and
  reproducing the image frame by comparing the system time with one of the extracted time stamp and the corrected time stamp.

12. The method according to claim 11, further comprising:
  storing the latest time stamp determined to be correct,
  wherein the step of determining determines that the extracted time stamp is incorrect if the extracted time stamp represents an earlier time than the stored latest time stamp.

13. The method according to claim 11, further comprising:
  storing the latest time stamp determined to be correct and time information corresponding to the stored latest time stamp; and
  calculating a reference time by adding the stored latest time stamp, a predetermined time, and a difference between the stored time information and the separated time information from the present moving-image bit stream;
  wherein the step of determining determines that the extracted time stamp is incorrect if the extracted time stamp has passed the calculated reference time even if the extracted time stamp from the header information of the present moving-image packet represents a time later than the time represented by the stored latest time stamp.

14. The method according to claim 13, wherein:
  the step of storing stores the extracted time stamp as the latest time stamp if the extracted time stamp is determined to be correct; and
  the step of correcting adds a difference between the stored time information and the time information of the present moving-image bit stream to the stored latest time stamp if the time stamp is determined to be incorrect for generating a corrected time stamp.

15. The method according to claim 13, wherein the storing includes:
  storing the time stamp extracted from the moving-image packet immediately preceding the present packet;
  obtaining a difference between the extracted time stamp from the present moving-image packet and the time stamp of the immediately preceding the present moving-image packet; and
  determining that the time stamp of the present moving-image packet is correct if the difference is longer than a minimum frame interval and is not longer than a predetermined time.

16. A computer readable medium having executable computer program codes for controlling reproduction in an apparatus for decoding moving-image bit streams contained in moving-image packet and reproducing image frames using a generated system time, the computer readable medium comprising:
  a first program code for extracting from each moving-image packet a moving-image bit stream corresponding to an image frame and header information;
  a second program code for separating a time stamp, to be used for reproduction of the image frame, from the header information;
  a third program code for determining whether the extracted time stamp is correct based upon the separated time information and the latest time stamp determined to be correct;
  a fourth program code for correcting the extracted time stamp based upon the latest time stamp determined to be correct and the separated time information if the extracted time stamp is determined to be incorrect; and
  a fifth program code for reproducing the image frame by comparing the system time with one of the extracted time stamp and the corrected time stamp.

17. The computer readable medium according to claim 16, further including:
  a sixth program code for storing the latest time stamp determined to be correct,
  wherein the third program code determines that the extracted time stamp is incorrect if the extracted time stamp represents an earlier time than the stored latest time stamp.

18. The computer readable medium according to claim 16, further including:
  a seventh program code for storing the latest time stamp determined to be correct; and
  an eighth program code for calculating a reference time by adding the stored latest time stamp, a predetermined time, and a difference between the stored time information and the separated time information forma the present moving-image bit stream,
  wherein the third program code determines that the extracted time stamp is incorrect if the extracted time stamp has passed the calculated reference time even if the extracted time stamp from the header information of the present moving-image packet represents a time later than the time represented by the stored latest time stamp.

19. The computer readable medium according to claim 18, wherein:
the seventh program code stores the extracted time stamp as the latest time stamp if the extracted time stamp is determined to be correct, and
the fourth program code adds a difference between the stored time information and the time information of the present moving-image bit stream to the stored latest time stamp if the time stamp is determined to be incorrect for generating a corrected time stamp.

20. The computer readable medium according to claim 18, wherein the seventh program code stores the time stamp extracted from the moving-image packet immediately preceding the present packet, and the computer readable medium further includes:
a ninth program code for obtaining a difference between the extracted time stamp from the present moving-image packet and the time stamp of the immediately preceding the present moving-image packet; and
a tenth program code for determining the time stamp of the present moving-image packet is correct if the difference is longer than a minimum frame interval and is not longer than a predetermined time.

* * * * *

UNITED STATES PATENT AND TRADEMARK OFFICE
CERTIFICATE OF CORRECTION

PATENT NO. : 7,039,070 B2 Page 1 of 1
APPLICATION NO. : 09/983674
DATED : May 2, 2006
INVENTOR(S) : Kawakatsu It is certified that error appears in the above-identified patent and that said Letters Patent is hereby corrected as shown below:

Claim 1, column 11, line 34, after "system time" insert --with one of time--.

Claim 4, column 11, line 61, change "generated" to --generates--.

Claim 6, column 12, line 37, delete "time" (second occurrence).

Signed and Sealed this

First Day of August, 2006

JON W. DUDAS
*Director of the United States Patent and Trademark Office*